United States Patent [19]
Esfandiari et al.

[11] Patent Number: 5,499,049
[45] Date of Patent: Mar. 12, 1996

[54] ENVIRONMENTAL RECORDING APPARATUS

[76] Inventors: Sohrab Esfandiari, 7 Blade Ct., Walnut Creek, Calif. 94595; Mohamadreza Zarringhalam, 303 Starfish La., Redwood City, Calif. 94065

[21] Appl. No.: 293,452

[22] Filed: Aug. 22, 1994

[51] Int. Cl.$^6$ ........................................................ H04N 7/18
[52] U.S. Cl. ................................ 348/143; 348/373; 360/5
[58] Field of Search .................................... 348/143, 373; 360/5; H04N 7/18

[56] References Cited

U.S. PATENT DOCUMENTS 4,789,904  12/1988  Peterson ................................. 348/373

Primary Examiner—Howard W. Britton
Attorney, Agent, or Firm—Donald E. Schreiber

[57] ABSTRACT

The technical field of the invention generally concerns environmental recording apparatuses for photographing events occurring during a seismic event. The environmental recording apparatus includes a base securely fastened to a mounting surface. Disposed on the base is a seismic isolation structure. Secured on the seismic isolation structure is a camera mount which receives a camera. A motion sensing switch secured to the mounting surface activates the camera in response to a seismic acceleration which exceeds a preestablished threshold is secured to the base. An electrical signal cable connects the motion sensing switch to the camera to couple an electrical signal from the motion sensing switch to a camera during a seismic event. An inner and outer protective housings enclose the camera.

17 Claims, 4 Drawing Sheets

ENVIRONMENTAL RECORDING APPARATUS

BACKGROUND OF THE INVENTION

1. Field of the Invention

The present invention relates generally to environmental recording apparatuses, and more particularly to an apparatus which uses a Camcorder to photographically record an earthquake's effects on structures and components.

2. Description of the Prior Art

Since to date there does not appear to be any good quality photographic recordings of live earthquakes, it appears that no prior art exists for the present invention. While for that reason the inventive combination appears novel, some parts of the present invention are already known, but only in other contexts. For example, the seismic isolation structure used in the preferred embodiment of the present invention is now an accepted alternative in seismic design and retrofit of buildings. Base isolators of this type separate the ground shaking from the building, and thereby dampen the effects of earthquakes on buildings. This seismic isolation structure is used in the present invention to insulate the Camcorder from the ground shaking to obtain a good quality photographic recording. Similarly, motion sensitive electric switches have also been used in the past for shutting off utilities in response to an earthquake's motions.

SUMMARY OF INVENTION

The present invention provides an environmental recording apparatus which can be used in studying the effects of earthquakes on various structures, components and systems.

An object of the present invention is to provide an environmental recording apparatus for acquiring knowledge about the behavior of structures and components during earthquakes.

Another object of the present invention is to provide an environmental recording apparatus for acquiring knowledge which may be used in developing improved seismic resistant design and in retrofitting of buildings thereby increasing seismic safety.

Another object of the present invention is to provide an environmental recording apparatus which permits insurance companies to obtain evidence on the effects and aftermath of an earthquake for use in properly processing insurance claims.

Yet another object of the present invention is to provide an environmental recording apparatus which may be used by news media in obtaining clear pictures of earthquakes and their effects.

Briefly, the invention is an environmental recording apparatus for photographing events occurring during a seismic event. The environmental recording apparatus includes a base adapted to be securely fastened to a mounting surface. Disposed in a statically stable position on the base is a seismic isolation structure. Thus, while a seismic event does not occur the seismic isolation structure does not move with respect to the base. Secured on the seismic isolation structure is a camera mount that is adapted for receiving a camera. The seismic isolation structure insulates the camera mount from movement of the mounting surface during a seismic event. A motion sensing switch, which is adapted for activating a camera in response to a seismic acceleration which exceeds a preestablished threshold is secured to the mounting surface.

The environmental recording apparatus also includes an electrical signal cable having a first end which is coupled to the motion sensing switch, and having a second end which is adapted for being coupled to a camera secured to the camera mount. The electrical signal cable couples an electrical signal from the motion sensing switch to a camera for activating the camera during a seismic event. The electrical signal cable has sufficient length and is disposed so as to permit unrestrained movement of a camera mounted on the seismic isolation structure with respect to the base during a seismic event which exceeds the pre-established threshold to which the motion sensing switch responds.

A preferred embodiment of the environmental recording apparatus also includes an inner protective housing secured to the seismic isolation structure, and an outer protective housing secured to the base. The inner protective housing encloses the camera mount while the outer protective housing encloses the inner protective housing and the seismic isolation structures. Portions both of the inner protective housing and of the outer protective housing are transparent so a camera mounted on the camera mount may photograph events occurring outside the protective housings.

A preferred embodiment for the seismic isolation structure includes four separate hollow depressions formed into the base. Each of the depressions is formed with a spherical shape having a first radius, and with its nadir disposed nearest to the mounting surface when the seismic isolation structure is fastened thereto. The nadirs of all four depressions lie in a plane and are located at vertices of a quadrilateral which is preferably a square. The seismic isolation structure also includes four spherically-shaped balls, each of the balls being respectively stably positioned into a different one of the four depressions. The balls all have a radius which is smaller than the first radius of the depressions, but is sufficiently large that each of the balls projects outward from the depressions above an upper surface of the base. A planar, lower surface of a plate, which has a first surface on which is disposed the camera mount, contacts and rests upon all four of the balls. The preferred embodiment of the base of the environmental recording apparatus also includes a restraining wall formed on the upper surface of the base. The restraining wall encloses all four depressions, all four balls positioned in the depressions, and the plate resting on the balls. A layer of resilient material is disposed between the restraining wall and the plate to completely encircle the plate, the balls and the depressions. Thus, the restraining wall limits movement of the plate with respect to the base during a seismic event while the resilient material absorbs impact force between the plate and the restraining wall. Thus assembled, the seismic isolation structure insulates an apparatus secured thereon from movement during a seismic event in response to movement of the mounting surface.

These and other features, objects and advantages will be understood or apparent to those of ordinary skill in the art from the following detailed description of the preferred embodiment as illustrated in the various drawing figures.

Drawing reference numerals

| Number | Name | Number | Name |
|---|---|---|---|
| 10 | Environmental recording Apparatus | 112 | Motion sensing switch |
|  |  | 116 | Electrical signal cable |
| 12 | Base | 122 | Aperture |
| 14 | Concrete mounting surface | 200 | Camcorder Switch block |
|  |  | 202 | Camera-off-VTR switch |
| 16 | Bolt | 204 | Camera lock/stanby switch |
| 18 | Upper surface of the base |  |  |
|  |  | 206 | Camera push button switch |
| 22 | Spherically shaped depressions | 208 | Camera push button switch |
| 26 | Nadir |  |  |
| 30 | Nail | 212 | Camera rewind switch |
| 42 | Steel ball | 214 | Camera run switch |
| 52 | Plate | 216 | Camera fast forward switch |
| 54 | Lower surface of the plate |  |  |
|  |  | 218 | Camera stop switch |
| 56 | Upper surface of the plate | 222 | Camera pause switch |
|  |  | 224 | Camera record switch |
| 58 | Camera mounting assembly | 226 | Tape eject switch |
|  |  | 232 | Camera start/stop push button switch |
| 62 | Restraining wall |  |  |
| 66 | Layer of resilient material layer | 234 | Camera start/stop push button switch |
| 72 | Camera mounting plate | 242 | Recording LED |
|  |  | 244 | Pause LED |
| 74 | Camcorder | 248 | Moisture condensation LED |
| 76 | Hinge |  |  |
| 78 | Base plate | 252 | Relay |
| 82 | Block | 254 | Relay Coil |
| 92 | Inner protective housing | 256 | Ground line |
|  |  | 258 | Battery |
| 94 | Aperture | 262 | Relay first contact |
| 96 | Camcorder access hinge | 264 | Relay second contact |
| 102 | Outer protective housing |  |  |
| 104 | Transparent glass |  |  |
| 106 | Handle |  |  |

DETAILED DESCRIPTION OF THE PREFERRED EMBODIMENT

Figure 1:
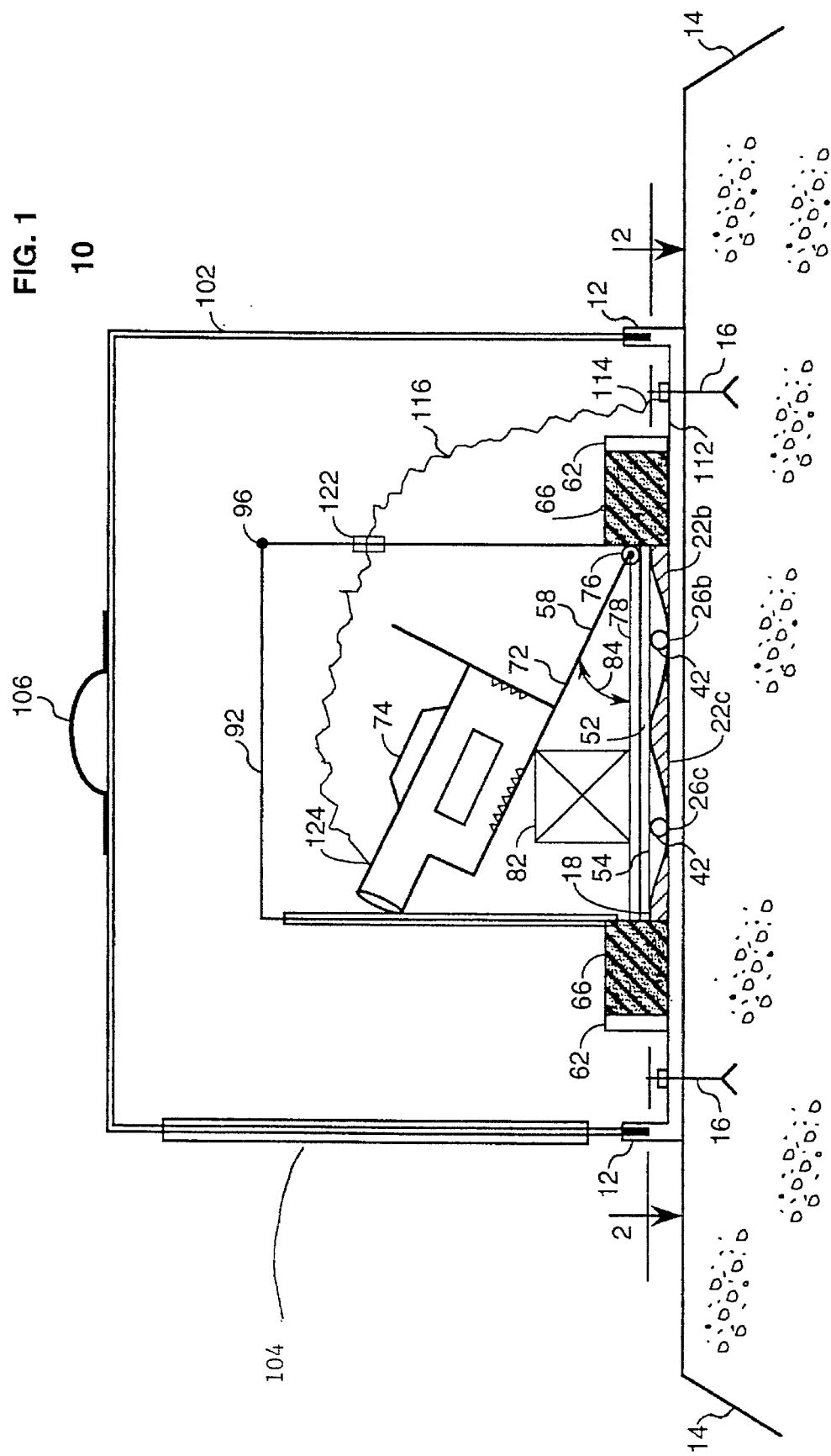
FIG. 1 is a cross-sectional elevational view depicting an environmental recording apparatus in accordance with the present invention including its seismic isolation structure and a Camcorder.
Figure 2:
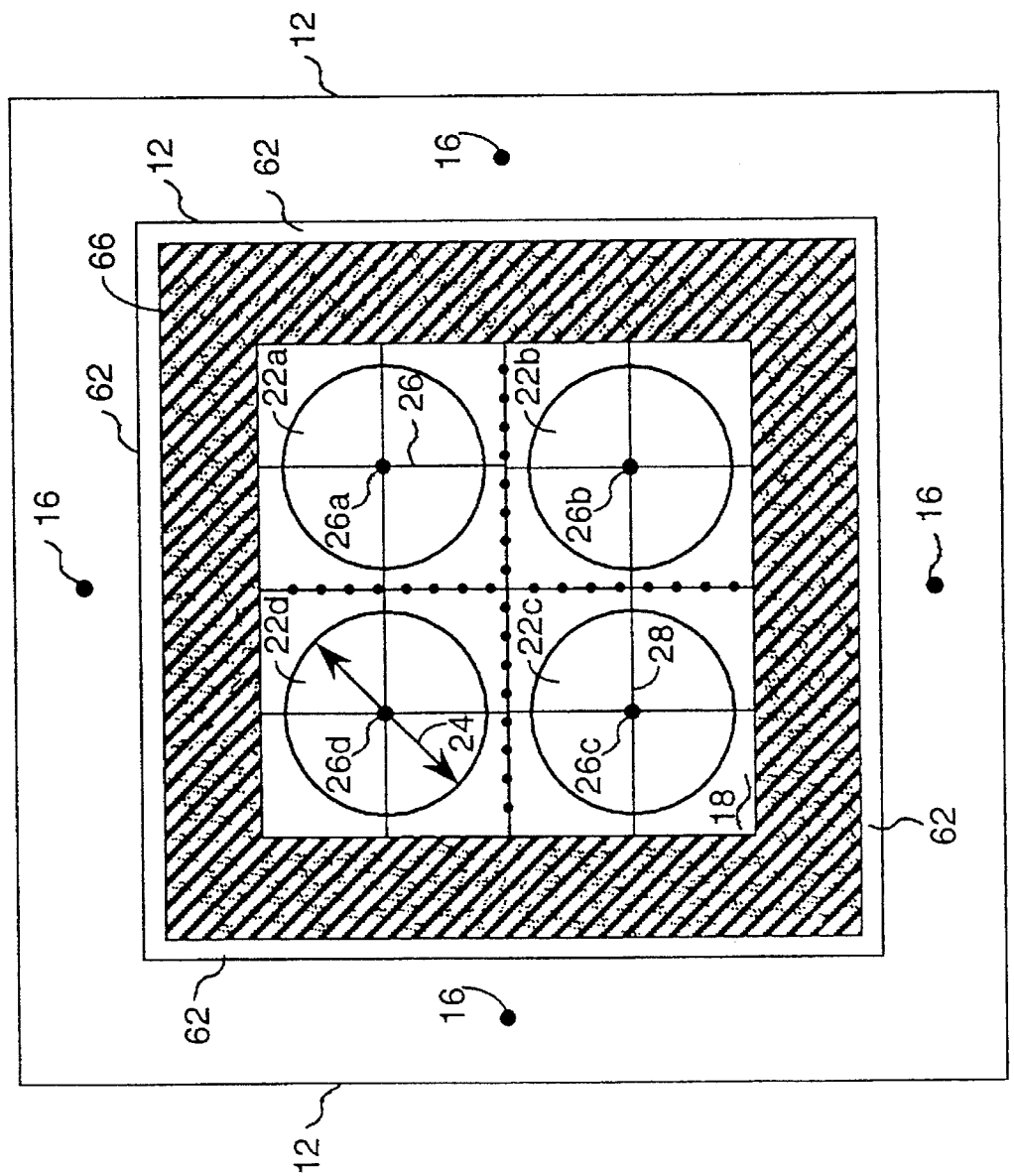
FIG. 2 is a plan view taken along the line 2—2 in FIG. 1 which depicts four spherically-shaped depressions included in the preferred embodiment of seismic isolation structure.

FIG. 1 depicts an environmental recording apparatus indicated by the general reference character 10. The environmental recording apparatus 10 includes a base 12 which is securely fastened to a concrete mounting surface 14 by bolts 16. Referring now also to FIG. 2, formed into an upper surface 18 of the base 12 are four spherically-shaped depressions 22a–22d. Each of the depressions 22a–22d is preferably 6 inches in diameter, indicated by the double headed arrow 24 in FIG. 2, and is preferably formed with a spherical radius of 33 inches. Each of the depressions 22a–22d respectively has a nadir 26a–26d. The nadirs 26a–26d are respectively located at the vertices of a quadrilateral that is preferably a square 28. The nadirs 26a–26d, which are the point of each of the depressions 22a–22d that is located nearest to the mounting surface 14, are also co-planar. The surface 18 which contains the four spherically-shaped depressions 22a–22d is attached to the base 12 through a series of nails 30.

Referring again to only FIG. 1, disposed in each of the depressions 22a–22d is a steel ball 42. Each of the balls 42 has a radius which is smaller than the radius of the depressions 22a–22d but is sufficiently large that each of the balls 42 projects outward from the nadirs 26a–26d of the depressions 22a–22d above the upper surface 18 of the base 12. In the preferred embodiment of the present invention the radius of the balls 42 is ⅜ of an inch. A plate 52, having a planar lower surface 54, contacts and rests upon the top of the balls 42 projecting above the upper surface 18 of the base 12. Disposed upon an upper surface 56 of the plate 52 is a camera mounting assembly 58.

Referring now also to FIG. 2, a restraining wall 62 projects upward from the base 12 to completely surround the depressions 22a–22d, the balls 42, and the plate 52. Disposed between the restraining wall 62 and the plate 52 is a layer 66 of resilient material. The layer 66 of resilient material is preferably 6 inches thick between the plate 52 and the immediately adjacent restraining wall 62. During a seismic event, the restraining wall 62 limits any movement of the plate 52 with respect to the base 12, while the layer 66 of resilient material absorbs energy and dampens movement of the plate 52 with respect to the restraining wall 62 and prevents the plate 52 from directly impacting the restraining wall 62.

The depressions 22a–22d formed into the base 12 in combination with the balls 42, the plate 52, the restraining wall 62 and the layer 66 of resilient material provide a seismic isolation structure which insulates the camera mounting assembly 58 from movement in response to movement of the mounting surface 14 during a seismic event. While a seismic event does not occur, the balls 42 and the plate 52 rest in a statically stable position so the plate 52 and the camera mounting assembly 58 resting upon it do not move with respect to the mounting surface 14.

The camera mounting assembly 58 includes a camera mounting plate 72 which receives a Camcorder 74. The camera mounting plate 72 is rotatably secured by a hinge 76 to a base plate 78 which rests on the plate 52. A block 82 of wood disposed between the camera mounting plate 72 and the 78 supports the weight of the camera mounting plate 72 and the Camcorder 74. By selecting an appropriate sized block 82 for insertion between the camera mounting plate 72 and the hinge 76, the Camcorder 74 may be set at a selected angle, indicated in FIG. 1 by the curved arrow 84, between 0 degree and 40 degree to align the Camcorder 74 with an object of interest.

A box-shaped inner protective housing 92 rests on the plate 52 to enclose the camera mounting assembly 58 and the Camcorder 74. An aperture 94 formed through the inner protective housing 92 permits the Camcorder 74 to photograph events occurring outside the inner protective housing 92. A hinge 96, located along one edge of the box-shaped inner protective housing 92, facilitates access to the Camcorder 74 within the inner protective housing 92. A box-shaped outer protective housing 102, which encloses the inner protective housing 92, the Camcorder 74, the camera mounting assembly 58 and the seismic isolation structure, is locked to the base 12. A transparent pane 104 of glass, set into the outer protective housing 102, permits the Camcorder 74 to photograph events occurring outside the outer protective housing 102. A handle 106, secured to the top of the box shaped outer protective housing 102, facilitates removal of the outer protective housing 102 from around the inner protective housing 92. The outer protective housing 102 shields the Camcorder 74 from the surrounding environment, and also deters vandalism of the environmental recording apparatus 10.

Secured to the mounting surface 14 is a motion sensing switch 112 which responds to a seismic acceleration that exceeds a preestablished threshold. The preestablished threshold above which the motion sensing switch 112 responds is set sufficiently high that it will not respond to minor seismic events or to other sources of vibration such a truck driving nearby. A first end 114 of an electrical signal cable 116 is coupled to the motion sensing switch 112. The electrical signal cable 116 passes through an aperture 122 formed through the inner protective housing 92 so a second end 124 of the electrical signal cable 116 may be coupled to the Camcorder 74. The electrical signal cable 116 couples an electrical signal from the motion sensing switch 112 to the Camcorder 74 for activating the Camcorder 74 if the motion sensing switch 112 receives an acceleration that exceeds the preestablished threshold. The electrical signal cable 116 is provided with sufficient length that the electrical signal cable 116 does not restrain movement of the Camcorder 74 with respect to the mounting surface 14 upon the occurrence of a seismic event having an acceleration which exceeds the preestablished threshold.

Figure 3:
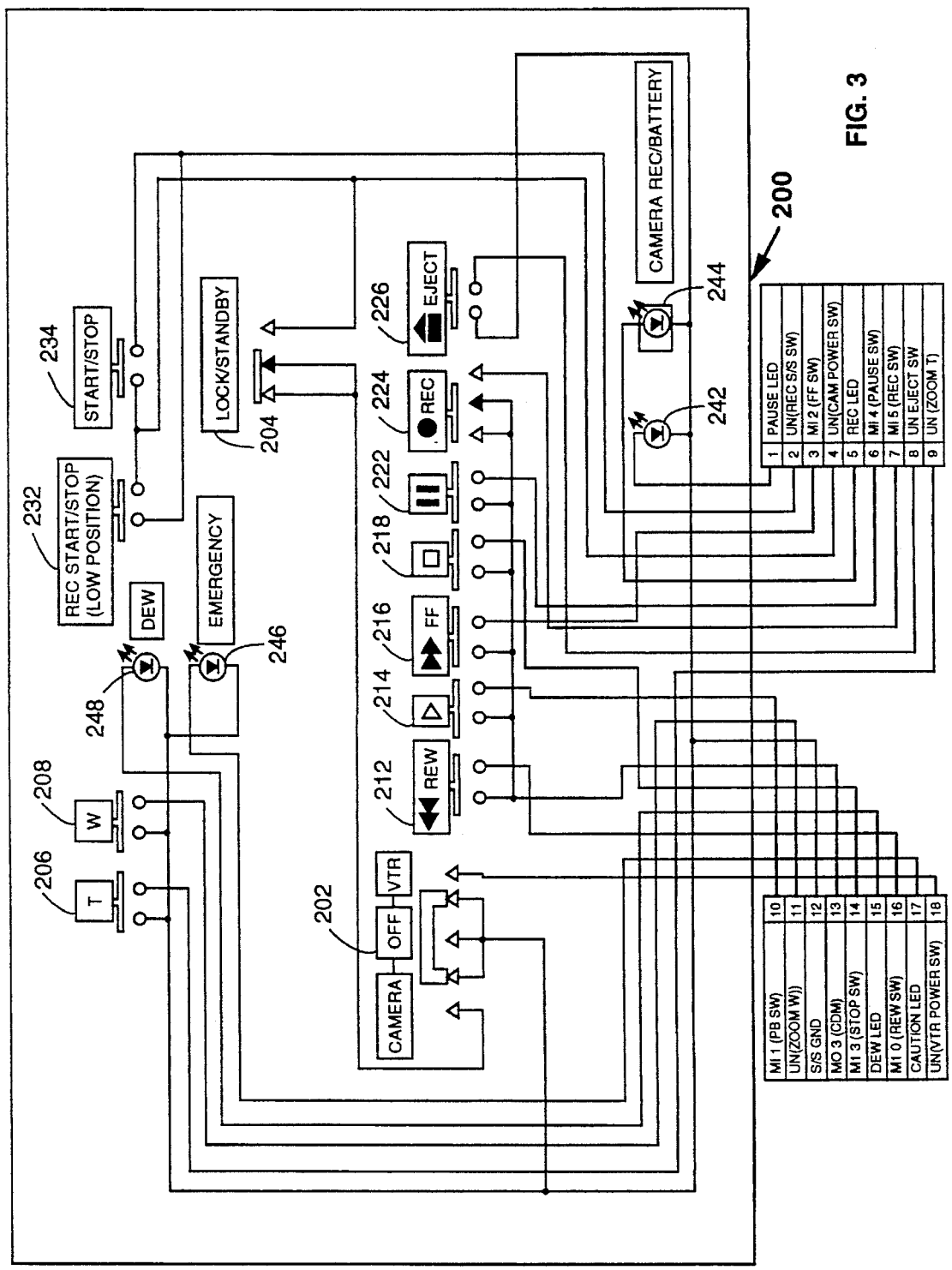
FIG. 3 is a functional type block diagram depicting a typical switch block included in a conventional Camcorder.

Referring now to FIG. 3, depicted there is a typical switch block of a type included in the Camcorder 74 which is referred to by the general reference character 200. The switch block 200 includes a sliding, three position camera-off-VTR switch 202 which is activated only if a lock/standby switch 204 is moved all the way to the right in FIG. 3. If the camera-off-VTR switch 202 is moved all the way to the left in FIG. 3, the Camcorder 74 makes a video recording. If the camera-off-VTR switch 202 is moved all the way to the right in FIG. 3, the Camcorder 74 replays a video recording.

Positioning the camera-off-VTR switch 202 in the middle turns off the Camcorder 74. The switch block 200 also includes a pair of push-button switches 206 and 208 which control the operation of a zoom lens included in the Camcorder 74.

The switch block 200 also includes several push-button switches for controlling movement of a recording tape within the Camcorder 74. Thus the switch block 200 includes a rewind switch 212, a run switch 214, a fast forward switch 216, a stop switch 218, a pause switch 222, a record switch 224, and a tape eject switch 226. The switch block 200 also includes a pair of push-button switches 232 and 234 either of which may be pressed to start or stop video recording or playback.

The switch block 200 includes a recording Light Emitting Diode ("LED") 242 which glows when the Camcorder 74 records. The switch block 200 also includes a pause LED 244 which glows if recording or playback has been paused by pressing the pause switch 222. The switch block 200 includes a caution LED 246 which glows if electrical power to the Camcorder 74 is low. Finally, the switch block 200 includes an LED 248 which glows if moisture has condensed inside the unit.

Figure 4:
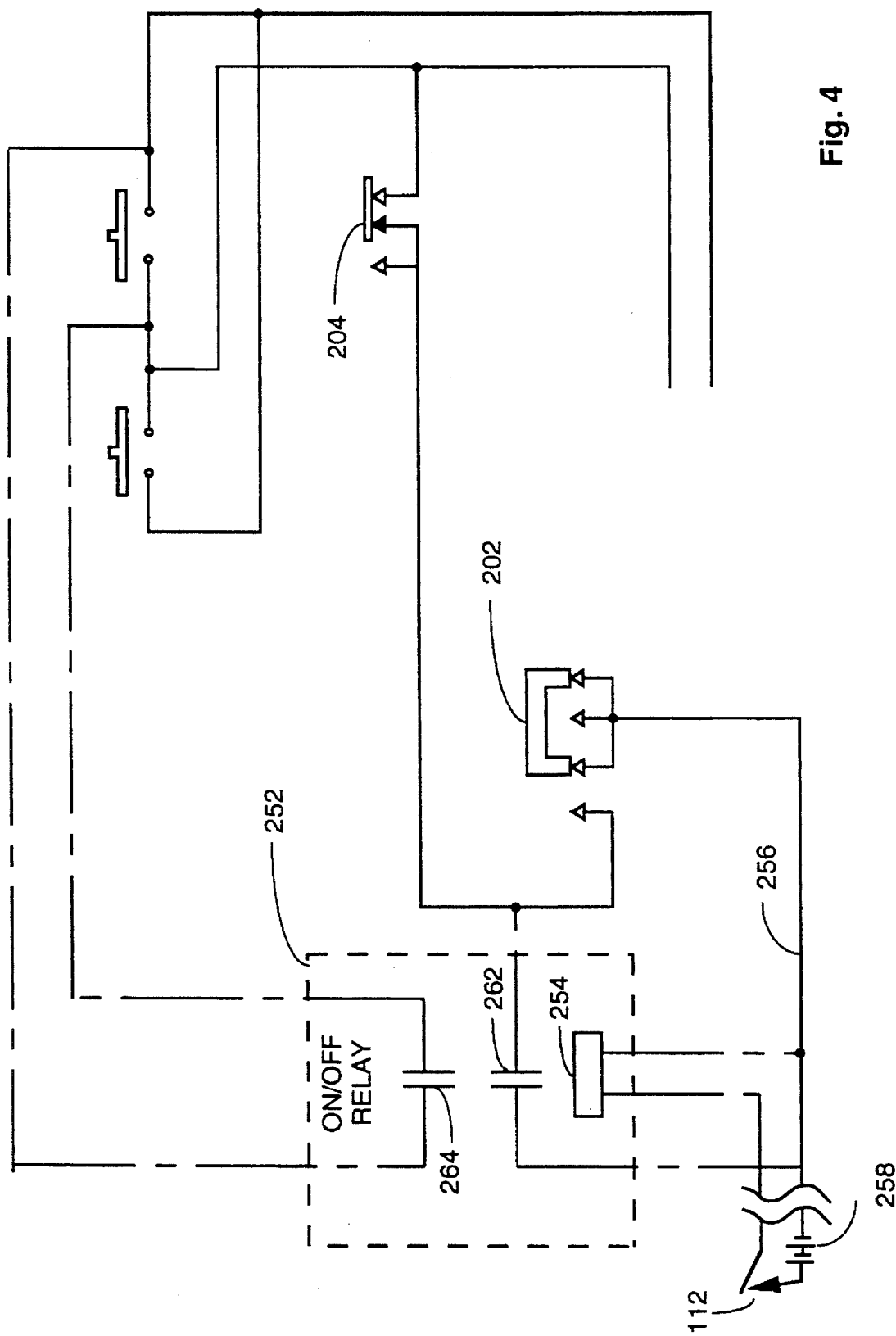
FIG. 4 is a functional type block diagram depicting only modifications which must be made to the switch block of FIG. 3 to adapt the Camcorder for use in the environmental recording apparatus.

Referring now to FIG. 4, depicted there are modifications which must be made to the switch block 200 to adapt the Camcorder 74 for use in the environmental recording apparatus 10. For the Camcorder 74 to operate in the environmental recording apparatus 10, the lock/standby switch 204 must be moved to the right in FIGS. 3 and 4, and the camera-off-VTR switch 202 must be moved to its center position. Furthermore, a recording tape must be installed in the Camcorder 74 and the switches 212–224 must be properly set up for recording. A double pole relay 252 is added to the switch block 200, and a first terminal of a relay coil 254 included in the relay 252 is connected to a ground line 256 of the switch block 200. A second terminal of the relay coil 254 connects in series with the motion sensing switch 112 and with a source of electrical energy such as a battery 258. If the motion sensing switch 112 experiences an acceleration which exceeds its pre-established threshold, then an electric current flows through the relay coil 254 to energize the relay 252.

Upon energizing the relay 252, a first pair of contacts 262 close. Closure of the first pair of contacts 262 electrically connects a camera pole of the camera-off-VTR switch 202 to the ground line 256 thereby electronically simulating movement of the camera-off VTR switch 202 all the way to the left in FIGS. 3 and 4. As set forth above, moving the camera-off-VTR switch 202 all the way to the left causes the Camcorder 74 to operate as a video recorder. Energizing the relay 252, also closes a second pair of contacts 264 included in the relay 252. Closure of the second pair of contacts 264 electronically simulates pressing one or the other of the push-button switches 232 and 234 to start the Camcorder 74 operating. Because the first pair of contacts 262 are closed, the Camcorder 74 operates as a video recorder.

With the environmental recording apparatus 10 properly installed and set-up, if a seismic event occurs the mounting surface 14 will begin to move following movement imposed on it by the ground. This will in turn shake the base 12 causing the four balls 42 to roll within the depressions 22a–22d. Rolling of the balls 42 within the depressions 22a 22d insulates the plate 52 and the camera mounting assembly 58 from shaking thus permitting the Camcorder 74 to remain essentially motionless. Concurrently, the motion sensing switch 112 will close in response to the seismic event's acceleration thereby activating the Camcorder 74 to photographically record the effects of the seismic event.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. An environmental recording apparatus adapted for use in photographically recording a seismic event, said environmental recording apparatus comprising:

a base adapted for being securely fastened to a mounting surface;

a seismic isolation structure disposed upon said base in a statically stable position whereby while a seismic event does not occur said seismic isolation structure does not move with respect to the mounting surface, said seismic isolation structure being adapted for insulating an apparatus secured thereon from movement in response to movement of said mounting surface during the seismic event;

a camera mount which is adapted for receiving a camera and which is secured on said seismic isolation structure so said seismic isolation structure insulates said camera mount from movement of said mounting surface during a seismic event;

a motion sensing switch which is secured to the mounting surface and which is adapted for activating a camera in response to a seismic acceleration if such an acceleration exceeds a preestablished threshold; and an electrical signal cable having a first end which is coupled to said motion sensing switch and having a second end which is adapted for being coupled to a camera secured on said camera mount, said electrical signal cable coupling an electrical signal from said motion sensing switch to a camera for activating said camera during a seismic event, said electrical signal cable having sufficient length and having that length of electrical signal cable disposed such that said electrical signal cable does not restrain a camera from moving with respect to the mounting surface upon the occurrence of a seismic event having an acceleration that exceeds the preestablished threshold to which said motion sensing switch responds.

2. The environmental recording apparatus of claim 1 further comprising a camera for recording visual images during a seismic event.

3. The environmental recording apparatus of claim 1 further comprising an protective housing secured to said base and which encloses said seismic isolation structure, a portion of said protective housing being transparent whereby a camera mounted on said camera mount may photograph events occurring outside said protective housing.

4. The environmental recording apparatus of claim 1 further comprising an inner protective housing supported on said seismic isolation structure and which encloses said camera mount, a portion of said inner protective housing being transparent whereby a camera mounted on said camera mount may photograph events occurring outside said inner protective housing.

5. The environmental recording apparatus of claim 4 further comprising an outer protective housing secured to said base and which both encloses said seismic isolation structure and said inner protective housing, a portion of said outer protective housing being transparent whereby a camera mounted on said camera mount may photograph events occurring outside said outer protective housing.

6. The environmental recording apparatus of claim 1 wherein said seismic isolation structure comprises:

four separate hollow depressions formed into said base, each of said depressions being formed with a spherical shape having a first radius, and also being formed so a nadir of each of the depressions is disposed nearest to the mounting surface when said seismic isolation structure is fastened to the mounting surface, the nadirs of all four depressions lying at vertices of a quadrilateral which lies in a plane;

four spherically-shaped balls, each of said balls being respectively stably positioned into a different one of said depressions, said balls having a radius which is smaller than the first radius of said depressions but is sufficiently large that each of said balls projects outward from the depressions above an upper surface of said base; and a plate having a first surface on which is disposed said camera mount, said plate having a second planar surface which contacts and rests upon all four of said balls.

7. The environmental recording apparatus of claim 6 wherein the quadrilateral at which vertices the nadirs of the depressions lie is a square.

8. The environmental recording apparatus of claim 6 further comprising a camera.

9. The environmental recording apparatus of claim 6 further comprising an protective housing secured to said base and which encloses said seismic isolation structure, a portion of said protective housing being transparent whereby a camera mounted on said camera mount may photograph events occurring outside said protective housing.

10. The environmental recording apparatus of claim 6 further comprising an inner protective housing supported on said seismic isolation structure and which encloses said camera mount, a portion of said inner protective housing being transparent whereby a camera mounted on said camera mount may photograph events occurring outside said inner protective housing.

11. The environmental recording apparatus of claim 10 further comprising an outer protective housing secured to said base and which both encloses said seismic isolation structure and said inner protective housing, a portion of said outer protective housing being transparent whereby a camera mounted on said camera mount may photograph events occurring outside said outer protective housing.

12. The environmental recording apparatus of claim 6 wherein said base further includes a restraining wall formed on the upper surface of said base, said restraining wall surrounding all four depressions, all four balls positioned in said depressions, and said plate resting on said balls; said environmental recording apparatus further comprising a layer of resilient material disposed between said restraining wall and said plate, said restraining wall limiting movement of said plate with respect to said base during a seismic event, during a seismic event said resilient material absorbs energy and dampens movement of said plate with respect to said restraining wall.

13. The environmental recording apparatus of claim 12 wherein the quadrilateral is a square.

14. The environmental recording apparatus of claim 12 further comprising a camera.

15. The environmental recording apparatus of claim 12 further comprising an protective housing secured to said base and which encloses said seismic isolation structure, a portion of said protective housing being transparent whereby a camera mounted on said camera mount may photograph events occurring outside said protective housing.

16. The environmental recording apparatus of claim 12 further comprising an inner protective housing supported on said seismic isolation structure and which encloses said camera mount, a portion of said inner protective housing being transparent whereby a camera mounted on said camera mount may photograph events occurring outside said inner protective housing.

17. The environmental recording apparatus of claim 16 further comprising an outer protective housing secured to said base and which both encloses said seismic isolation structure and said inner protective housing, a portion of said outer protective housing being transparent whereby a camera mounted on said camera mount may photograph events occurring outside said outer protective housing.

* * * * *